United States Patent
Feng et al.

(10) Patent No.: US 9,231,737 B1
(45) Date of Patent: *Jan. 5, 2016

(54) METHOD AND APPARATUS FOR REMOTELY INCREASING AVAILABLE PROCESSING TIME AT A WIRELESS DEVICE WHILE MAINTAINING RESPONSE DELAY TIME

(71) Applicant: Marvell International Ltd., Hamilton (BM)

(72) Inventors: Weishi Feng, San Jose, CA (US); Peter Loc, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 185 days.

This patent is subject to a terminal disclaimer.

(21) Appl. No.: 14/032,694

(22) Filed: Sep. 20, 2013

Related U.S. Application Data

(63) Continuation of application No. 13/180,260, filed on Jul. 11, 2011, now Pat. No. 8,542,703, which is a continuation of application No. 12/151,185, filed on May 5, 2008, now Pat. No. 7,978,675, which is a (Continued)

(51) Int. Cl.
*H04L 1/16* (2006.01)

(52) U.S. Cl.
CPC .................................. *H04L 1/1692* (2013.01)

(58) Field of Classification Search
USPC .......................................................... 370/471
See application file for complete search history.

(56) References Cited

U.S. PATENT DOCUMENTS 5,768,695 A 6/1998 Fischer et al.
5,982,807 A 11/1999 Snell (Continued)

FOREIGN PATENT DOCUMENTS

EP 0680177 A2 11/1995
EP 1041770 A2 10/2000

(Continued)

OTHER PUBLICATIONS

IEEE Std 802.11a-1999 (Supplement to IEEE Std 802.11-1999) [Adopted by ISO/IEC and redesignated as ISO/IEC 8802-11: 1999/Amd 1:2000(E)]; Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications High-speed Physical Layer in the 5 GHz Band; LAN/MAN Standards Committee of the IEEE Computer Society; 91 pages.

(Continued)

*Primary Examiner* — Michael Thier
*Assistant Examiner* — Kent Krueger

(57) ABSTRACT

A first wireless device includes a coding module that encodes packets and adds dummy data to a second packet. A first receiver (i) in response to transmission of a first packet, receives a first acknowledgement (ACK) signal, and (ii) in response to transmission of the second packet, receives a second ACK signal. Reception of the first ACK signal is delayed a first delay period from an end of the transmission of the first packet. Reception of the second ACK signal is delayed a second delay period from an end of the transmission of the dummy data. The coding module, prior to the transmission of the second packet and based on time to process the first and second packets at a second wireless device, determines the amount of dummy data to add to the second packet such that the first delay period is a same length as the second delay period.

20 Claims, 6 Drawing Sheets

Related U.S. Application Data continuation of application No. 11/824,993, filed on Jul. 3, 2007, now Pat. No. 7,468,990, which is a continuation of application No. 10/080,454, filed on Feb. 21, 2002, now Pat. No. 7,239,648.

(60) Provisional application No. 60/333,579, filed on Nov. 27, 2001.

(56) References Cited

U.S. PATENT DOCUMENTS

| | | |
|---|---|---|
| 6,236,674 B1 | 5/2001 | Morelli et al. |
| 6,603,801 B1 | 8/2003 | Andren et al. |
| 6,675,012 B2 | 1/2004 | Gray |
| 6,678,310 B1 | 1/2004 | Andren et al. |
| 6,697,013 B2 | 2/2004 | McFarland et al. |
| 6,721,302 B1 | 4/2004 | Alastalo |
| 6,754,170 B1 | 6/2004 | Ward |
| 6,865,609 B1 | 3/2005 | Gubbi et al. |
| 6,934,752 B1 | 8/2005 | Gubbi |
| 6,950,397 B1 | 9/2005 | Ho et al. |
| 6,970,422 B1 | 11/2005 | Ho et al. |
| 6,978,149 B1 | 12/2005 | Morelli et al. |
| 7,039,000 B2 | 5/2006 | You et al. |
| 7,039,068 B1 | 5/2006 | Halasz |
| 7,039,140 B2 | 5/2006 | Reagan et al. |
| 7,054,296 B1 | 5/2006 | Sorrells et al. |
| 7,239,648 B1 | 7/2007 | Feng et al. |
| 7,352,770 B1 | 4/2008 | Yonge, III et al. |
| 7,468,990 B1 | 12/2008 | Feng et al. |
| 7,978,675 B1 | 7/2011 | Feng et al. |
| 8,542,703 B1 | 9/2013 | Feng et al. |
| 2001/0009555 A1 | 7/2001 | Diepstraten et al. |
| 2001/0010689 A1 | 8/2001 | Awater et al. |
| 2004/0196861 A1* | 10/2004 | Rinchiuso et al. ............ 370/441 |

FOREIGN PATENT DOCUMENTS

| | | |
|---|---|---|
| EP | 1089480 A2 | 4/2001 |
| EP | 1119137 A1 | 7/2001 |
| EP | 1119153 A1 | 7/2001 |
| WO | WO-9949636 A1 | 9/1999 |

OTHER PUBLICATIONS

IEEE Std 802.11b-1999 (Supplement to IEEE Std 802.11-1999 Edition): Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.

ANSI/IEEE Std. 802.11, 1999 Edition, Sponsor LAN MAN Standard Committee of IEEE Computer Society, "Part 11: Wireless LAN Medium Access Control (MAC) and Physical Layer (PHY) Specifications."

* cited by examiner

FIG. 7
Prior Art
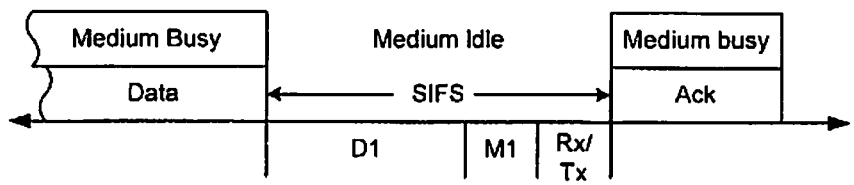
FIG. 8
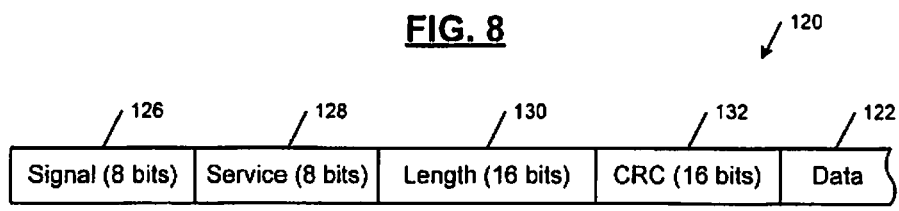
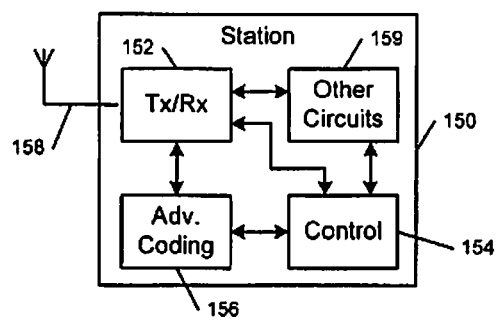
FIG. 9

METHOD AND APPARATUS FOR REMOTELY INCREASING AVAILABLE PROCESSING TIME AT A WIRELESS DEVICE WHILE MAINTAINING RESPONSE DELAY TIME

CROSS-REFERENCE TO RELATED APPLICATIONS

The present disclosure is a continuation of U.S. application Ser. No. 13/180,260 (now U.S. Pat. No. 8,542,703), filed Jul. 11, 2011, which is a continuation of U.S. application Ser. No. 12/151,185 (now U.S. Pat. No. 7,978,675), filed on May 5, 2008, which is a continuation of U.S. application Ser. No. 11/824,993 (now U.S. Pat. No. 7,468,990), filed Jul. 3, 2007, which is a continuation of U.S. application Ser. No. 10/080,454 (now U.S. Pat. No. 7,239,648), filed Feb. 21, 2002, which claims priority under 35 U.S.C. §119(e) to U.S. Provisional Application No. 60/333,579, filed Nov. 27, 2001. The entire disclosures of the applications referenced above are incorporated herein by reference.

FIELD

The present invention relates to wireless local area networks (WLANs), and more particularly to transmitters, receivers and/or transceivers of WLANs.

BACKGROUND

A wireless local area network (WLAN) uses radio frequency (RF) signals to transmit and receive data between electronic devices. WLANs provide all of the features and benefits of traditional hard-wired LANs without requiring cable connections between the devices. Referring now to FIG. 1, an infrastructure-based WLAN 10 includes a wireless access point 11 that provides a transparent connection between stations 12-1, 12-2, ..., and 12-n and a network 14. The network 14 typically includes a distributed communication system 16 such as an Ethernet and one or more servers 18.

The access point 11 is the wireless equivalent of a hub. The access point 11 communicates with the wireless stations 12 using antennas 22. The access point 11 maintains the connections to the stations 12 that are located in a coverage area 24. The access point 11 also typically handles security by granting or denying access to the network 14. Similarly, a wireless access point 32 provides a transparent connection between stations 34-1, 34-2, ..., and 34-n and the network 14. The access point 32 also communicates with the wireless stations 34 using antennas 42. The wireless access point 32 maintains the connections to stations 34 that are located in a coverage area 42.

Referring now to FIG. 2, an independent WLAN 38 supports direct wireless communications between stations 40-1, 40-2, ..., and 40-n in a coverage area 42. Referring now to FIG. 3, stations 50 include a controller 52, and a transceiver 54 that is connected to one or more antennas 56. The stations 50 include additional circuits 58 for processing transmit/receive signals and for performing various other common functions of stations 50. Referring now to FIG. 4, access points 60 also include a transceiver 64 that is connected to one or more antennas 66. Likewise, the access point 60 includes additional circuits 68 for processing transmit/receive signals and for performing various other common functions of access points 60.

Referring now to FIG. 5, a WLAN architecture 70 for stations 50 and the access point 60 is shown. The architecture 70 includes a media access control (MAC) sublayer 72 that communicates with a MAC layer manager 74. A physical layer convergence protocol (PLCP) sublayer 76 and a physical medium dependent (PMD) sublayer 78 communicate with a physical layer manager 80. IEEE sections 802.11, 802.11 (a), and 802.11(b), which are hereby incorporated by reference, set forth other specifications and operating details of the WLAN architecture 70.

When multiple stations are located in a coverage area, they compete for access to a medium. In other words, only a single station can transmit data or acknowledge receipt of data at a time. Standards such as IEEE sections 802.11, 802.11(a), and 802.11b set forth a specific protocol for WLAN communications to accommodate contention between the devices for the medium.

Referring now to FIG. 6, a source station 90 transmits data 92. Following a short interframe space (SIFS), a destination station 96 generates an acknowledgment (ACK) 98. IEEE section 802.11 and other related sections set forth a maximum time interval for the destination station 96 to respond with the ACK 98. Other stations 100 must defer access during the transmission of the data 92 and for a period that is longer than the SIFS to avoid contention.

Referring now to FIG. 7, the SIFS is shown in further detail. The SIFS is defined as a nominal time that the MAC and PHY require to receive the last symbol of a frame, to process the frame, and to respond with a first symbol of a response frame. In other words, aSIFSTime=aRXRFDelay+ aRXPLCPDelay+aMACProcessingDelay+aRxTxTurn- aroundTime. For both 802.11 and 802.11(b), the nominal aSIFSTime is defined as 10 microseconds (μs).

In FIG. 7, D1 is equal to aRXRFDelay+aRXPLCPDelay, which corresponds to a receiver delay and a receiver processing delay, respectively. M1 is equal to aMACProcessingDelay, which is the processing delay of the MAC layer. RxTx is equal to the RxTxTurnaroundTime, which is the delay associated with a transition between receiver and transmitter modes.

In implementations that comply with IEEE section 802.11 and related sections, aSIFSTime must not vary from the defined nominal SIFS time value by more than 10% of the slot time. For both sections 802.11 and 802.11(b), aSIFSTime must be between 8 and 12 μs as measured on the medium to be compatible. These limitations on aSIFSTime prevent the use of advanced signal processing techniques. For example, Turbo coding, Reed-Solomon coding, convolutional code concatenated with Reed-Solomon coding, and other advanced error coding techniques are not possible when backward compatibility is required. These advanced signal processing techniques allow higher data rates and/or provide other advantages. However, the advanced signal processing techniques also require receiver processing time that is typically longer than the nominal aSIFSTime that is defined by IEEE 802.11 and related sections.

SUMMARY

A first wireless device is provided and includes a coding module, a transmitter, and a first receiver. The coding module is configured to encode a first packet and a second packet. The coding module is configured to add a predetermined amount of dummy data to the second packet. The transmitter is configured to transmit the first packet and the second packet to a second wireless device. The first receiver is configured to (i) in response to the transmission of the first packet to the second wireless device, receive a first acknowledgement signal from the second wireless device, and (ii) in response to the transmission of the second packet to the second wireless device, receive a second acknowledgement signal from the second wireless device. Reception of the first acknowledgement signal at the receiver is delayed a first delay period from an end of the transmission of the first packet. Reception of the second acknowledgement signal at the receiver is delayed a second delay period from an end of the transmission of the dummy data. The coding module is configured to, prior to the transmission of the second packet to the second wireless device and based on (i) time to process the first packet at the second wireless device, and (ii) time to process the second packet at the second wireless device, determine the amount of dummy data to add to the second packet such that a length of the first delay period is a same length as the second delay period.

In other features, a method is provided and includes: encoding a first packet and a second packet at a first wireless device; adding a predetermined amount of dummy data to the second packet; transmitting the first packet and the second packet from the first wireless device to a second wireless device; and in response to the transmission of the first packet to the second wireless device, receiving, at the first wireless device, a first acknowledgement signal from the second wireless device. The method also includes in response to the transmission of the second packet to the second wireless device, receiving, at the first wireless device, a second acknowledgement signal from the second wireless device. Reception of the first acknowledgement signal at the first wireless device is delayed a first delay period from an end of the transmission of the first packet. Reception of the second acknowledgement signal at the first wireless device is delayed a second delay period from an end of the transmission of the dummy data. Prior to the transmission of the second packet to the second wireless device and based on (i) time to process the first packet at the second wireless device, and (ii) time to process the second packet at the second wireless device, the amount of dummy data to add to the second packet such that a length of the first delay period is a same length as the second delay period is determined.

In general, in one aspect, this specification describes, a first wireless device comprising: a transmitter configured to transmit, in accordance with a first mode of operation or a second mode of operation, a packet to a second wireless device, wherein the packet includes a header portion and a data portion. A maximum time interval for the second station to respond to the packet is as follows: (i) in response to the packet being transmitted to the second device in accordance with the first mode of operation, the second device is to respond to the packet within a predetermined time period, and (ii) in response to the packet being transmitted to the second device in accordance with the second mode of operation, the second device is to respond to the packet in a time greater than the predetermined time period.

In response to the packet being transmitted to the second device in accordance with the first mode of operation, the transmitter is configured to encode the header portion of the packet to indicate that the packet is being sent in accordance with the first mode of operation, and in response to the packet being transmitted to the second device in accordance with the first mode of operation, the transmitter is configured to i) encode the header portion of the packet to indicate that the packet is being sent in accordance with the second mode of operation, and ii) insert dummy data into the data portion of the packet, wherein the dummy data sent to the second device during the time greater than the predetermined time period.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 7 illustrates timing of a short interframe space (SIFS) according to the prior art;

FIG. 8 illustrates a physical layer convergence protocol (PLCP) header followed by data according to the present invention;

FIG. 9 is a functional block diagram of a station according to the present invention;

DESCRIPTION

Figure 1:
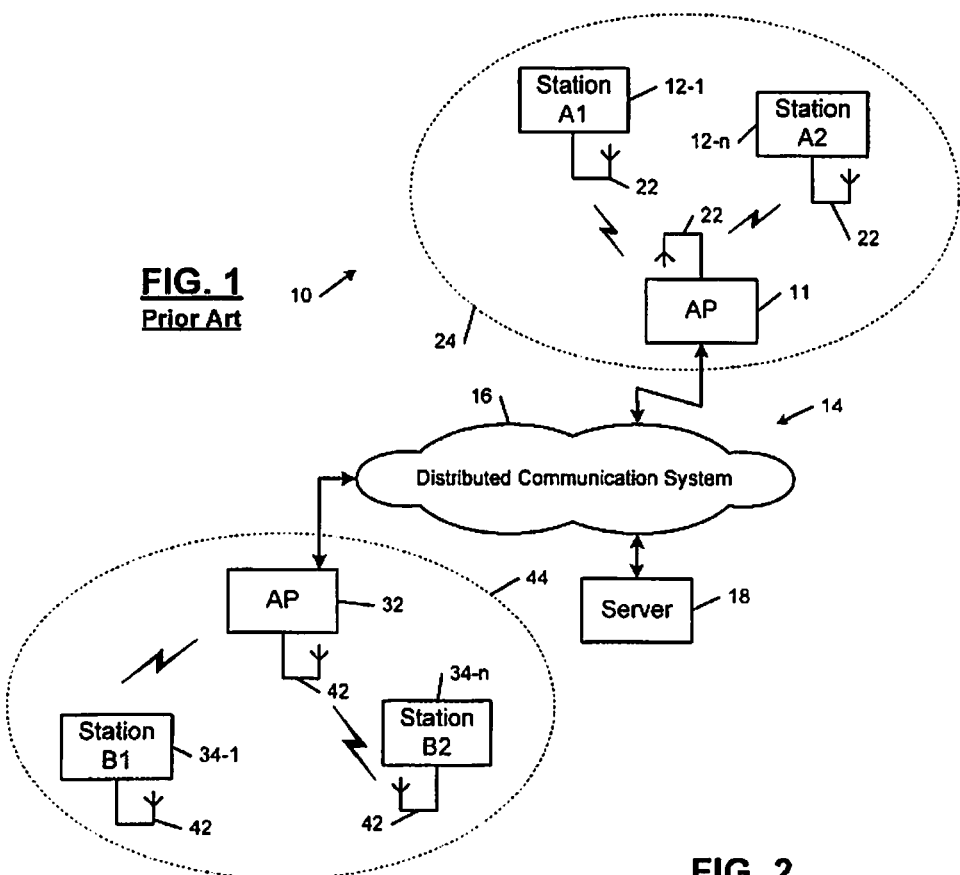
FIG. 1 is a functional block diagram of an infrastructure-based WLAN according to the prior art.

The following description of the preferred embodiment(s) is merely exemplary in nature and is in no way intended to limit the invention, its application, or uses.

Referring now to FIG. 8, a PLCP header 120 precedes data 122. The PLCP header 120 includes a signal portion 126, a service portion 128, a length portion 130, and a CRC portion 132. The signal portion 126 is typically 8 bits, the service portion 128 is typically 8 bits, the length portion is typically 16 bits, the CRC portion 132 is typically 16 bits, and the data 122 typically has a length between 64-2300 bytes.

Allowed values for the signal portion 126 are currently defined by the IEEE section 802.11 and other related sections as follows: "0A" (in hexadecimal) is for 1 Mbps; "14" is for 2 Mbps, "37" is for 5.25 Mbps, and "6E" is for 11 Mbps. According to the present invention, an additional code "XX" is used to indicate an extension mode. The additional code "XX" is a predetermined code that can be set equal to any unused hexadecimal code. For example, the additional code can be set to "8E" (hexadecimal).

A length portion 130 is typically used to define the number of microseconds that are required to transmit a PLCP service data unit (PSDU) or the data 122 when the signal portion 126 is set equal to "0A", "14", "37", or "6E". According to the present invention, the length portion 130 is set equal to a number of microseconds that are required to transmit the data 122 and an additional extension time $T_{ext}$ when the signal portion 126 is set equal to "XX".

Figure 10:
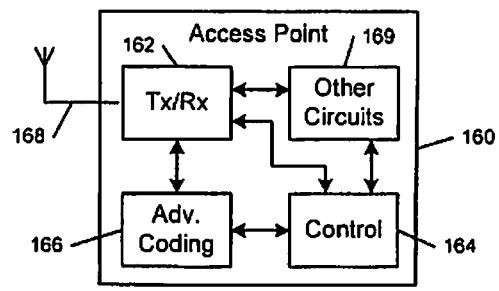
FIG. 10 is a functional block diagram of an access point according to the present invention.

Referring now to FIG. 9, a station 150 according to the present invention includes a transceiver 152, a controller 154, an advanced coding and decoding circuit 156, an antenna 158 and other circuits 159 that perform common station functions. Referring now to FIG. 10, access point 160 includes a transceiver 162, a controller 164, an advanced coding and decoding circuit 166, an antenna 168 and other circuits 169 that perform common functions of access points 160.

Figure 2:
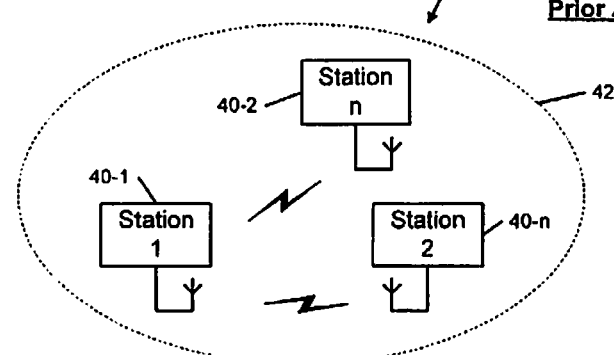
FIG. 2 is a functional block diagram of an independent WLAN according to the prior art.
Figure 3:
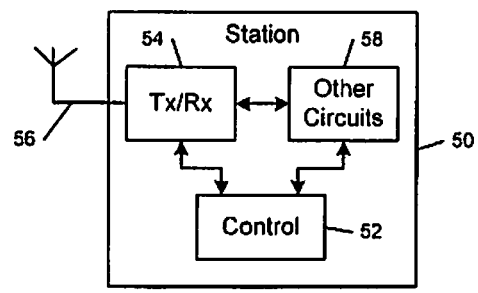
FIG. 3 is a functional block diagram of a station according to the prior art.
Figure 4:
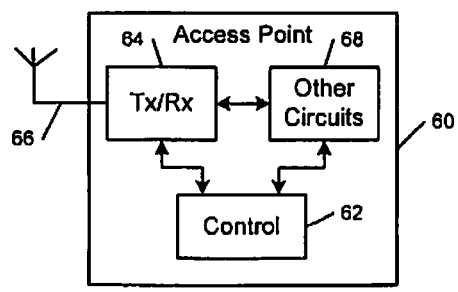
FIG. 4 is a functional block diagram an access point according to the prior art.
Figure 5:
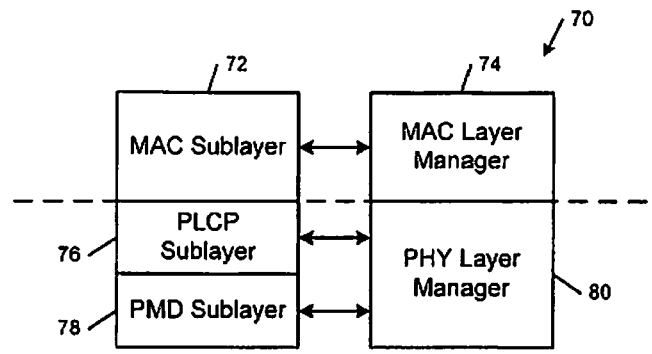
FIG. 5 is a functional block diagram of a MAN architecture according to the prior art.
Figure 6:
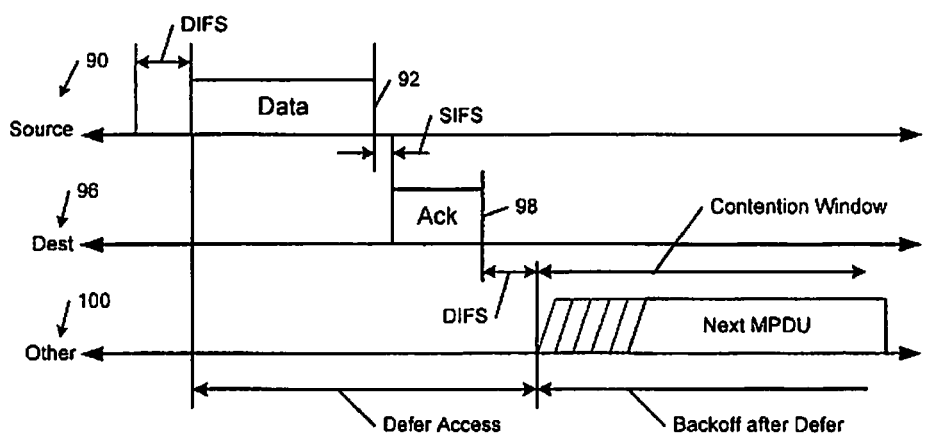
FIG. 6 illustrates timing of data and acknowledgment signals according to the prior art.
Figure 11:
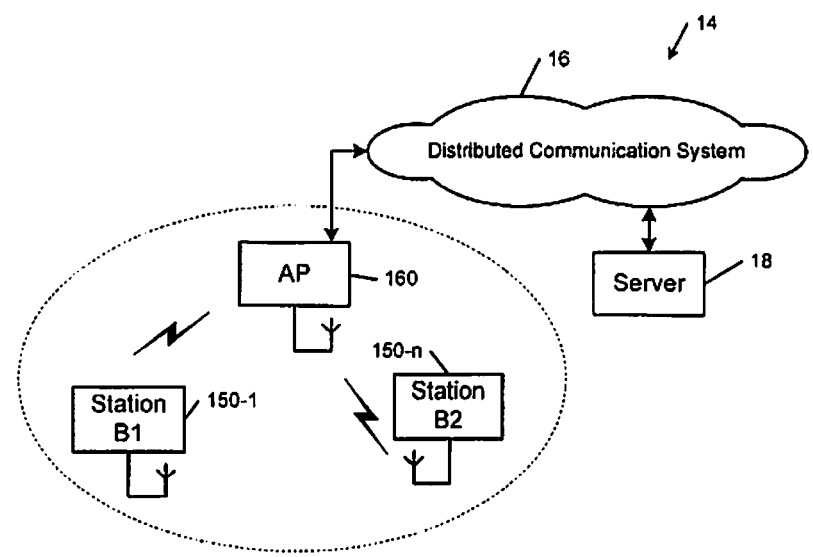
FIG. 11 is a functional block diagram of an infrastructure-based WLAN according to the present invention.
Figure 12:
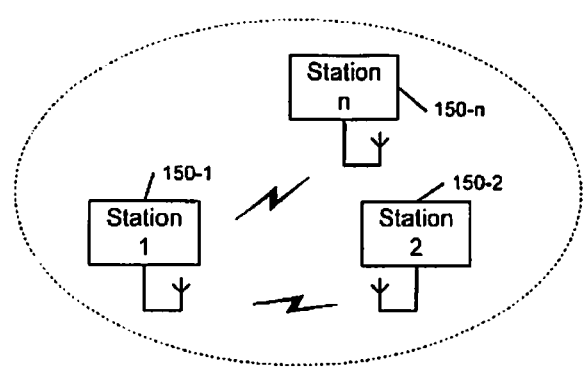
FIG. 12 is a functional block diagram of an independent WLAN according to the present invention.

Referring now to FIG. 11, the present invention will be described in the context of a wireless RF signal that is originated by the access point 160 and that is intended for the station 150-1 in FIG. 11. Reference numbers from FIGS. 1 and 2 have been used in FIG. 11 to identify similar elements. Skilled artisans can appreciate that the RF signal can be initiated by the station 150-1 and be intended for the access point 160. In FIG. 12, the RF signals can also be generated between stations 150-1 and 150-2.

Figure 13:
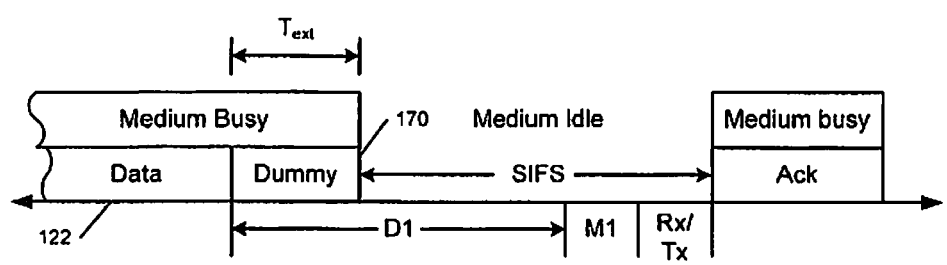
FIG. 13 illustrates timing of data, dummy data, D1, SIFS, and acknowledgment (ACK) according to the present invention.

Referring now to FIG. 13, when the transmitter 162 is operating in the extension mode, the transmitter 162 sets the signal portion 126 equal to "XX". In addition, the length portion 130 is set equal to the number of microseconds for the data 122 and the extension time $T_{ext}$. Dummy data 170 is inserted at the end of the data 122. The dummy data 170 is sent during the extension time $T_{ext}$. The extension time $T_{ext}$ is used to extend the duration of D1 and to allow advanced signal processing such as advanced error coding for extension mode capable devices.

The transceiver 152 receives the PLCP header 120 with the signal portion 126 and the length portion 130 that specify the extension mode. Upon receiving the PLCP header correctly, the transceiver knows from the length portion 130 that there is a packet being transmitted and that the transmission requires the time that is specified in the length portion. The target station or access point knows that valid data ends a period $T_{ext}$ before the time that is specified in the length field of the PLCP header 120.

As can be appreciated, other stations and/or access points are not impacted by the extension mode. For stations and access points without the extension mode capability, the data 122 ends after the dummy data 170. In other words, the physical carrier sense or energy detection of other stations or access points will indicate a clear channel assessment (CCA) busy signal during the period $T_{ext}$. This CCA busy state remains until after the transmission of the dummy data 170 ends. Therefore, the SIFS time requirements of IEEE section 802.11 and other related sections are still met while providing backward compatibility.

The present invention provides a solution for advanced signal processing that is transparent to the MAC layer. Therefore, there is no need to change IEEE section 802.11 MAC layer specifications to accommodate the extension mode. The dummy data 170 causes a negligible efficiency loss because the length of the dummy data 170 is much smaller than a typical length of the data 122.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A first wireless device comprising:
a coding module configured to encode a first packet and a second packet, wherein the coding module is configured to add an amount of dummy data to the second packet;
a transmitter configured to transmit the first packet and the second packet to a second wireless device; and
a first receiver configured to (i) in response to the transmission of the first packet to the second wireless device, receive a first acknowledgement signal from the second wireless device, and (ii) in response to the transmission of the second packet to the second wireless device, receive a second acknowledgement signal from the second wireless device,
wherein
reception of the first acknowledgement signal at the receiver is delayed a first delay period from an end of the transmission of the first packet,
reception of the second acknowledgement signal at the receiver is delayed a second delay period from an end of the transmission of the dummy data, and
the coding module is configured to, prior to the transmission of the second packet to the second wireless device and based on (i) a predetermined time to process the first packet at the second wireless device, and (ii) a predetermined time to process the second packet at the second wireless device, determine the amount of dummy data to add to the second packet such that a length of the first delay period is a same length as the second delay period.

2. The first wireless device of claim 1, wherein:
the transmitter is configured to (i) transmit the first packet to the second wireless device during a first mode, and (ii) transmit the second packet to the second wireless device during a second mode;
the first packet comprises a first header field;
the first header field indicates the first mode;
the second packet comprises a second header field; and
the second header field indicates the second mode.

3. The first wireless device of claim 2, wherein the coding module is configured to encode:
the first packet based on the first mode; and
the second packet based on the second mode.

4. The first wireless device of claim 3, wherein:
the second mode corresponds to an extension signal processing mode; and
the extension signal processing mode includes at least one of Turbo coding, Reed-Solomon coding, or convolution coding.

5. The first wireless device of claim 2, wherein:
the first packet includes a first data field;
the second packet includes a second data field;
the first header field indicates a first length of the first data field; and
the second header field indicates a second length collectively of the second data field and the dummy data.

6. The wireless device of claim 5, wherein, during the second mode:
the first data field defines the first length based on a first predetermined amount of time to transmit the first packet; and
the second data field defines the second length based on (i) a second predetermined amount of time to transmit the second packet, plus (ii) a third predetermined amount of time to transmit the dummy data.

7. The first wireless device of claim 5, wherein:
the advanced error coding includes at least one of Turbo coding, Reed-Solomon coding, and convolution coding;
the second length corresponds to (i) a second transmit period for transmission of the second data field, and (ii) a third transmit period for transmission of the dummy data; and the third transmit period provides additional processing time for the second packet by the second wireless device while maintaining the length of the second delay period at the same length as the first delay period.

8. The first wireless device of claim 1, wherein:
the first period corresponds to a nominal time period that a media access control sublayer and a physical layer of the second wireless device (i) receive a last symbol of the first packet, (ii) process the first packet, and (iii) respond with a first symbol of the first acknowledgement signal; and
the second period corresponds to a nominal time period that the media access control sublayer and the physical layer of the second wireless device (i) receive a last symbol of the second packet, (ii) process the second packet, and (iii) respond with a first symbol of the second acknowledgement signal.

9. A system comprising:
the first wireless device of claim 1; and
the second wireless device,
wherein
the first packet comprises a first header,
the second packet comprises a second header,
the second wireless device comprises
a second receiver configured to receive the first packet and the second packet, and
a decoding module configured to decode (i) the first packet based on the first header, and (ii) the second packet based on the second header.

10. The system of claim 9, wherein:
transmission of the dummy data from the transmitter of the first wireless device provides an extension period, wherein the extension period provides additional decoding time for decoding the second packet at the second wireless device; and
the decoding module is configured to perform extension mode decoding of the second packet during the extension period defined by the second header.

11. A method comprising:
encoding a first packet and a second packet at a first wireless device;
adding an amount of dummy data to the second packet;
transmitting the first packet and the second packet from the first wireless device to a second wireless device;
in response to the transmission of the first packet to the second wireless device, receiving, at the first wireless device, a first acknowledgement signal from the second wireless device;
in response to the transmission of the second packet to the second wireless device, receiving, at the first wireless device, a second acknowledgement signal from the second wireless device,
wherein
reception of the first acknowledgement signal at the first wireless device is delayed a first delay period from an end of the transmission of the first packet, and
reception of the second acknowledgement signal at the first wireless device is delayed a second delay period from an end of the transmission of the dummy data; and
prior to the transmission of the second packet to the second wireless device and based on (i) a predetermined time to process the first packet at the second wireless device, and (ii) a predetermined time to process the second packet at the second wireless device, determining the amount of dummy data to add to the second packet such that a length of the first delay period is a same length as the second delay period.

12. The method of claim 11, wherein:
the first packet is transmitted to the second wireless device during a first mode;
the second packet is transmitted to the second wireless device during a second mode;
the first packet comprises a first header field;
the first header field indicates the first mode;
the second packet comprises a second header field; and
the second header field indicates the second mode.

13. The method of claim 12, wherein:
the first packet is encoded based on the first mode; and
the second packet is encoded based on the second mode.

14. The method of claim 13, wherein:
the second mode corresponds to an extension signal processing mode; and
the extension signal processing mode includes at least one of Turbo coding, Reed-Solomon coding, or convolution coding.

15. The method of claim 12, wherein:
the first packet includes a first data field;
the second packet includes a second data field;
the first header field indicates a first length of the first data field; and
the second header field indicates a second length collectively of the second data field and the dummy data.

16. The method of claim 15, wherein, during the second mode:
the first data field defines the first length based on a first predetermined amount of time to transmit the first packet; and
the second data field defines the second length based on (i) a second predetermined amount of time to transmit the second packet, plus (ii) a third predetermined amount of time to transmit the dummy data.

17. The method of claim 15, wherein:
the advanced error coding includes at least one of Turbo coding, Reed-Solomon coding, and convolution coding;
the second length corresponds to (i) a second transmit period for transmission of the second data field, and (ii) a third transmit period for transmission of the dummy data; and
the third transmit period provides additional processing time for the second packet by the second wireless device while maintaining the length of the second delay period at the same length as the first delay period.

18. The method of claim 11, wherein:
the first period corresponds to a nominal time period that a media access control sublayer and a physical layer of the second wireless device (i) receive a last symbol of the first packet, (ii) process the first packet, and (iii) respond with a first symbol of the first acknowledgement signal; and
the second period corresponds to a nominal time period that the media access control sublayer and the physical layer of the second wireless device (i) receive a last symbol of the second packet, (ii) process the second packet, and (iii) respond with a first symbol of the second acknowledgement signal.

19. A method of claim 11, further comprising:
receiving the first packet and the second packet at the second wireless device, wherein the first packet comprises a first header, and wherein the second packet comprises a second header; and decoding (i) the first packet based on the first header, and (ii) the second packet based on the second header.

20. The method of claim 19, further comprising performing extension mode decoding of the second packet during an extension period defined by the second header, wherein:
- the extension period provides additional decoding time for decoding the second packet at the second wireless device; and
- the transmitting of the dummy data from the first wireless device provides the extension period.

* * * * *